Aug. 23, 1966  J. R. DAVY ETAL  3,268,352
BLOOMING OF OPTICAL COMPONENTS WITH A COMPLEX
ALUMINO-SILICATE COMPOUND
Filed Sept. 15, 1958

Inventors
JOHN RUPERT DAVY and
JOHN STEWART ORR

By
Mason, Fenwick & Lawrence
Attorneys 3,268,352
BLOOMING OF OPTICAL COMPONENTS WITH A
COMPLEX ALUMINO-SILICATE COMPOUND
John Rupert Davy, Bearsden, Dunbartonshire, Great
Britain, and John Stewart Orr, Glasgow, Scotland,
assignors to Barr & Stroud Limited, Glasgow, Great
Britain, a British company
Filed Sept. 15, 1958, Ser. No. 761,256
8 Claims. (Cl. 117—33.3)

This invention relates to a process for blooming of light transmitting or reflecting optical components, of the type involving evaporation of a substance and deposition thereof on to the surface of the component in the form of a thin film or coating hereinafter referred to as a process of the aforesaid type. Such thin films or coatings may be provided for reduction of reflection from optical components having a high refractive index, or for protection of the surface for example in the case of a reflecting surface formed by deposition of thin films of metal or other high reflecting material which requires treatment to render the surface stable under conditions of handling and atmospheric contamination.

It has hitherto been accepted that the provision of such anti-reflection or protecting coatings is rendered difficult particularly in the case of components intended for use in the infra-red region of the electromagnetic spectrum, that is in the region from one micron to approximately five microns wavelength, by the paucity of coating materials which combine the necessary properties of optical transparency, refractive index, hardness, and the property of adhering to the underlying optical component or another thin film already deposited thereon. In addition, it is an undesirable property of many available materials that when deposited in relatively thick films as may sometimes be necessary, they tend to break up, by virtue of recrystallization or surface tension phenomena.

It has previously been suggested that the adhesion of many coatings having other desirable properties may be improved by the provision of a buffer layer between the coating and the surface on which it is to be deposited. For example in the blooming of arsenic trisulphide by means of silicon monoxide, a buffer layer of evaporated selenium has been interposed between the arsenic trisulphide surface and the coating of silicon monoxide. There are a number of other materials, for example antimony sulphide, which possess similar desirable features in improving adhesion without adversely affecting the optical performance of the combination.

According to the present invention we provide a process of the aforesaid type for coating optical components, in which the coating is deposited by the evaporation by heating under vacuum conditions of a mixture of aluminum oxide with silicon monoxide, the mixture having a layer of aluminum oxide above same during the evaporation.

Preferably said mixture comprises about one part by weight of aluminum oxide with four parts by weight of silicon monoxide, the whole being covered by a top layer of aluminum oxide having one fifth of the weight of the mixture; moreover, preferably the heating is effected by a spiral tungsten wire, passing through the mixture and layer, with electrical energization, the molten silicon monoxide passing up the wire by surface tension to blend with molten aluminum oxide prior to evaporation of the blended substance.

The coating deposited in accordance with the invention consists of a complex compound formed of the elements silicon aluminum and oxygen, the whole grouping into a combination comprising an alumino-silicate.

The resulting deposited coating shows a high adhesion to materials such as arsenic trisulphide, and possesses the requisite refractive index of approximately 1.6 to achieve a high degree of antireflection efficiency, based on the well-known antireflection laws. The film is hard, durable, transparent, and possesses an excellent adhesion to the underlying surface. Thick layers can be built up by evaporation without causing peeling or disintegration of the deposited film.

It is a further feature of this coating that it can be deposited on a reflecting surface e.g. aluminum, in such a way as to protect the aluminum from the effects of abrasion or chemical attack; and, instead of detracting from the reflectivity of the surface, it actually enhances this reflectivity by virtue of its relatively high refractive index and the comparative transparency of the alumina-silicate film.

We will now describe an example of the invention with reference to the accompanying drawing wherein.

Figure 1:
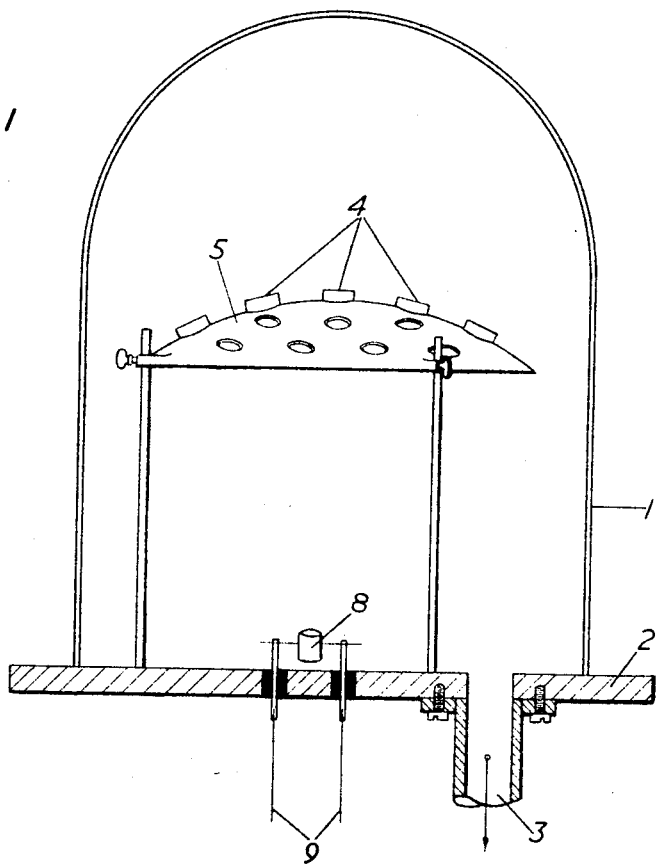
FIGURE 1 is a diagrammatic vertical section of the apparatus for coating.
Figure 2:
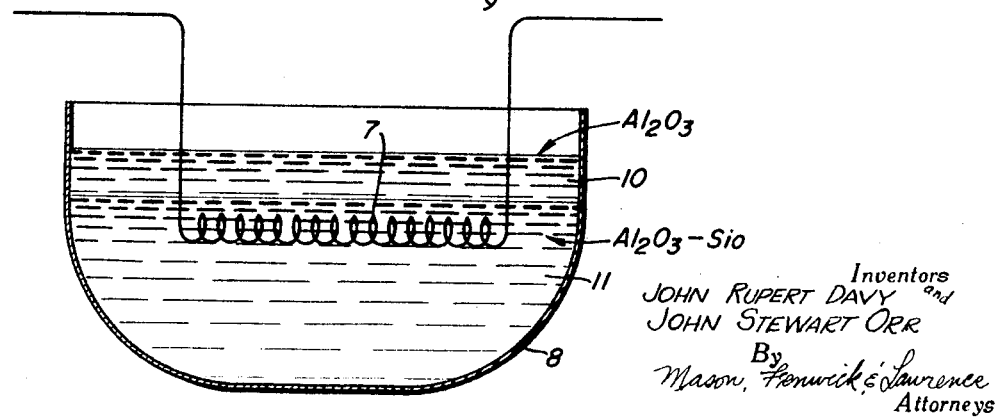
FIGURE 2 is an enlarged diagrammatic vertical section view of the crucible and contents.

A Bell jar 1 rests on a base plate 2 and is ready for evacuation by vacuum pumps of well known type (not shown) through an outlet 3 in the base plate.

In the near vacuum that can thus be created optical elements 4 are placed in a perforated concave support 5, so that the greater part of their upper and lower faces are free to receive material evaporated from the electrically heated coil 7, contained in a crucible 8. This coil 7 is preferably of tungsten wire but may be any suitable electrical conductor. The crucible 8 is of baked pyrophilite.

The heater current for the coil 7 is supplied through wires 9 from a variable transformer (not shown).

In the preferred method a mixture 11 of aluminum oxide (alumina) and silicon monoxide in the proportion of one part by weight of aluminum oxide powder to approximately four parts by weight of silicon monoxide powder is placed in a crucible containing a spiral of a suitable heating wire, such as tungsten.

The surface of the mixture is then covered by an upper layer 10 of pure aluminum oxide powder, without any admixture of silicon monoxide, the upper having about one fifth of the weight of the mixture.

To form the complex compound and achieve the evaporation, the tungsten is brought to white heat, at which point the silicon monoxide in the mixture at the bottom of the crucible is melted and wets the tungsten. The resulting liquid travels along the tungsten wire by virtue of the surface tension effect, and dissolves within itself the aluminum oxide, the solution is completed by the time the liquid reaches the surface of the top layer of aluminum oxide, by which time the solution is enriched in aluminum oxide. Evaporation is carried out in the shortest possible time.

In a typical example 2.5 grams of the mixture were placed in the crucible and 0.5 gram of aluminum oxide were spread over the surface of the mixture. A film of thickness about 0.8 micron was deposited on a surface 10 inches from the crucible in one minute, the temperature of the heater being about 1600° C. The resultant film had an optimum composition in the form of a complex compound derived from substantially equal parts of silicon monoxide and aluminum oxide.

In practice it is considered that it will generally be found to be unsuitable to have a greater ratio of silicon monoxide to aluminum oxide in the mixture than ten to one by weight.

We claim:

1. A process for coating optical components, including the step of depositing the coating by heating a mixture of aluminum oxide with silicon monoxide under vacuum conditions and evaporating same, the resultant coating being a complex compound comprising at least one alumino-silicate.

2. A process according to claim 1 in which the mixture has a layer of powdered aluminum oxide above same during evaporation.

3. A process according to claim 1 in which said mixture comprises about one part by weight of aluminum oxide with four parts by weight of silicon monoxide, the whole being covered by a top layer of one part by weight of powdered aluminum oxide.

4. A process according to claim 2 in which the aluminum oxide and silicon monoxide are melted and blended together prior to evaporation.

5. A process for coating optical components, including the steps of melting and blending together aluminum oxide and silicon monoxide to form a mixture, and depositing the coating by evaporation, the evaporation being caused by heating the mixture under vacuum conditions, the mixture having powdered aluminum oxide above same during evaporation, the resultant coating being a complex compound comprising an alumino-silicate.

6. A process for coating optical components, including the steps of surrounding a vertically disposed wire with a mixture of powdered aluminum oxide and silicon monoxide, the mixture having powdered aluminum oxide above same, applying heating to melt the mixture under vacuum conditions, and causing the molten mixture to travel up the wire by surface tension into the aluminum oxide above and blend therewith, evaporating the blended mixture, and causing the mixture to condense on said components, whereupon the silicon monoxide and aluminum oxide react together to form a complex alumino-silicate compound.

7. A process of the aforesaid type for coating optical components, including the steps of heating and melting silicon monoxide, dissolving aluminum oxide in the molten silicon monoxide to form a mixture, evaporating the mixture under vacuum conditions, and causing the mixture to condense on said components, whereupon the mixture reacts chemically to form a complex alumino-silicate compound.

8. An optical component having an evaporation deposited, optically transparent coating, said coating being substantially free of elemental metal and in the form of a complex compound comprising alumino-silicate derived from silicon monoxide and aluminum oxide.

References Cited by the Examiner
UNITED STATES PATENTS

| | | |
|---|---|---|
| 2,553,289 | 5/1951 | Alexander et al. |
| 2,641,954 | 6/1953 | Scharf et al. |
| 2,762,722 | 9/1956 | Truby. |
| 2,808,351 | 10/1957 | Colbert et al. |

WILLIAM D. MARTIN, *Primary Examiner.*

ARTHUR M. HORTON, *Examiner.*

C. C. WELLS, F. J. LEES, P. G. BETHERS, S. W. ROTHSTEIN, *Assistant Examiners.*